(12) United States Patent
Stichweh et al.

(10) Patent No.: US 8,975,858 B2
(45) Date of Patent: Mar. 10, 2015

(54) METHOD FOR CONTROLLING AN ASYNCHRONOUS MACHINE HAVING A CONVERTER IN A MANNER THAT IS OPTIMAL FOR (COPPER) LOSS

(75) Inventors: Heiko Stichweh, Springe (DE); Albert Einhaus, Garrel (DE); Matthias Wisgickl, Hirschau (DE)

(73) Assignee: Lenze Drives GmbH, Extertal (DE)

( * ) Notice: Subject to any disclaimer, the term of this patent is extended or adjusted under 35 U.S.C. 154(b) by 206 days.

(21) Appl. No.: 13/822,380

(22) PCT Filed: Sep. 24, 2010

(86) PCT No.: PCT/EP2010/064177
§ 371 (c)(1),
(2), (4) Date: Jun. 28, 2013

(87) PCT Pub. No.: WO2012/037983
PCT Pub. Date: Mar. 29, 2012

(65) Prior Publication Data
US 2013/0271061 A1    Oct. 17, 2013

(51) Int. Cl.
*H02P 21/00* (2006.01)
*H02P 23/00* (2006.01)
*H02P 27/06* (2006.01)

(52) U.S. Cl.
CPC ........ *H02P 21/0096* (2013.01); *H02P 23/0081* (2013.01); *H02P 27/06* (2013.01); *H02P 2207/01* (2013.01)
USPC ............................ 318/806; 318/767; 318/727

(58) Field of Classification Search
CPC ...................................................... H02P 21/00
USPC ......................................... 318/806, 767, 727
See application file for complete search history.

(56) References Cited

U.S. PATENT DOCUMENTS

| 5,442,271 A | 8/1995 | Hatanaka et al. |
| 5,500,581 A | 3/1996 | Hatanaka et al. |

(Continued)

FOREIGN PATENT DOCUMENTS

| DE | 19615095 C1 | 8/1997 |
| DE | 102006056902 A1 | 6/2008 |

(Continued)

OTHER PUBLICATIONS

Quang, Dittrich; "Praxis der feldorientierten Drehstromantriebsregelung"; Expert Verlag, 2. Auflage 1999.
Kirschen, Novoty, Lipo; "On-Line Efficiency Optimization of a Variable Motor Drive"; IEEE Trans. Industry Appl., vol. 21, Nr 4, Mai/Juni. 1985 Seiten 610-615.

(Continued)

*Primary Examiner* — David S Luo
(74) *Attorney, Agent, or Firm* — Hunton & Williams LLP

(57) ABSTRACT

The invention relates to a method for the open-loop or closed-loop control of an asynchronous machine with or without speed feedback, the asynchronous motor being controlled by a control device (converter or servo converter). First of all, a voltage vector rotating at a rotary field frequency is specified and impressed, both the rotary field frequency and the voltage vector being determined by an open-loop or closed-loop control based on a voltage-frequency characteristic curve configured in any manner and the voltage vector being adapted by a cos φ closed-loop control. Desired values of cos φ are calculated using rating plate data and equivalent circuit diagram data for an optimum-loss or loss-optimized operation of the asynchronous machine for the calculation of cos $\phi_{desired\ value}$, which results in optimized-loss operation. A value for cos $\phi_{actual}$ is then determined using the impressed voltage vector and a current vector or using the real power and apparent power. Thereafter, the difference is calculated between cos $\phi_{desired\ value}$ and cos $\phi_{actual}$ and a cos φ closed-loop control is fed with this input difference. A control value of the controller for cos φ is calculated and restricted and the voltage vector is adapted by the control value of the cos φ closed-loop control.

23 Claims, 4 Drawing Sheets

(56) References Cited

U.S. PATENT DOCUMENTS

Figure 1:
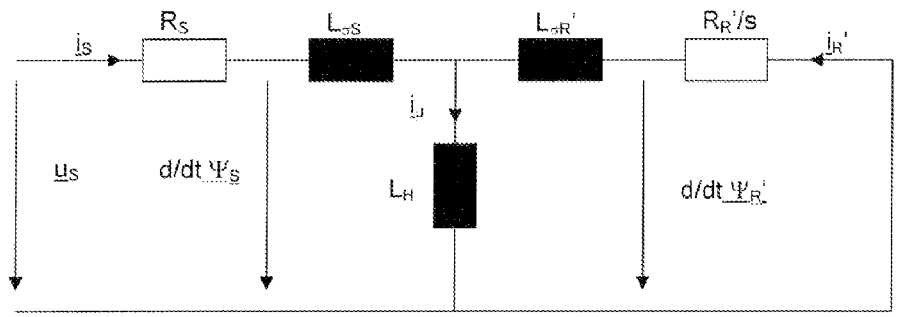

| | | | |
|---|---|---|---|
| 8,129,936 B2 * | 3/2012 | Becker et al. ............... | 318/802 |
| 8,159,174 B2 | 4/2012 | Vaucher et al. | |
| 2004/0135533 A1 | 7/2004 | Harakawa et al. | |

FOREIGN PATENT DOCUMENTS

| | | |
|---|---|---|
| EP | 0053916 A1 | 6/1982 |
| EP | 330477 A2 | 8/1989 |
| EP | 556013 B1 | 2/1993 |
| WO | 8706403 A1 | 10/1987 |

OTHER PUBLICATIONS

Abrahamsen; "Energy Optimal Control of Induction Motor Drives"; Institute of Energy Technology, Albor University Thesis Feb. 2000.

Chang, Kim; "Minimum-Time Minimum-Loss Speed Control of Induction Motors under Field-Oriented Control"; IEEE Trans. Industrial Electronics, vol. 44, Nr. 6, Dez. 1997 Seiten 809-815.

Perron & Le-Huy; "Full Load Neural Network Efficiency Optimization of an Iduction Motor with Vector Control using Discontinous PWM"; IEEE ISIE, Jul. 9-12, 2006 Montréal, Qerbec, Canada.

International Search Report, PCT/EP2010/064177, mailing date, Jun. 30, 2011.

* cited by examiner

METHOD FOR CONTROLLING AN ASYNCHRONOUS MACHINE HAVING A CONVERTER IN A MANNER THAT IS OPTIMAL FOR (COPPER) LOSS

The method invention disclosed in this application is used for the load-dependent and speed-dependent optimisation of the efficiency of a converter-fed asynchronous machine.

The method is used for asynchronous machines which are not operated with a field-oriented closed-loop control, but with a characteristic-based open-loop or closed-loop control. The method adapts the flux of the machine to the current load and speed or rotary field frequency such that the losses of copper occurring in the stator and rotor, which make up the greatest proportion of the total losses of the asynchronous machine, are reduced, in particular are even minimised for the stationary operating state.

Presently established electrical drive systems consisting of a frequency converter or servo converter and of an asynchronous machine are generally operated by a characteristic-based or field-oriented open-loop or closed-loop control. In both cases, an attempt is made to adjust the flux of the machine in the voltage adjustment range to be constant at its rated value, cf. Quang and Dittrich in "Praxis der feldorientierten Drehstromantriebsregelungen", $2^{nd}$ Edition 1999 Expert Verlag. This allows a dynamic behaviour during changes in load or during desired changes in speed as well as a good tilting stability of the asynchronous machine. A disadvantage of this type of solution is that particularly in the partial load range of between 0% and approximately 50% of the nominal moment, the flux which is kept constant is greater than is necessary for stable operation from an energy point of view. A specific flux reduction can produce in the partial load range a reduction in the stator current of the asynchronous machine and thereby an optimisation in efficiency. A function of this type is desirable for many applications in which only low dynamics are necessary and which are operated in the partial load range for relatively long periods of time. Uses in fan and pump technology or in conveyor technology can be mentioned here by way of example.

A number of different methods for minimising the losses of an asynchronous machine are known from different publications. In general, these methods can be divided into model-based approaches and algorithm-based approaches which look for an efficient operating point. The model-based approaches generally work on the basis of the field-oriented model of the asynchronous machine.

A large number of the publications are concerned with different variants of so-called cos φ closed-loop control. In this method, the efficiency of the machine is optimised by cos φ closed-loop control (known as 'power factor').

EP 330 477 A2 describes a method which calculates the voltage or current indicator using the phase voltages $U_u$, $U_v$ and $U_w$ and the measured phase currents $I_u$, $I_v$ and $I_w$ and then determines the difference in angle between the indicators or the cos $phi_{actual}$ (equally known as cos $\phi_{actual}$). In the motor control means, a table is assigned which allocates to each cos $phi_{actual}$ its own U/f characteristic curve. For this purpose, the characteristic curves have to be determined beforehand in a motor-specific manner with a constant load moment in each case over a particular range of speed. Thus, in this method, the cos $phi_{actual}$ indicates the prevailing load moment. A disadvantage of this method is the high complexity associated with the necessary characteristic curve measurement.

An alternative cos φ closed-loop control concept has been introduced in a number of documents, for example EP 556 013 B1, U.S. Pat. No. 5,442,271 and U.S. Pat. No. 5,500,581. Here, the is power factor cos $phi_{actual}$ is formed using the quotient of real power P and apparent power S. The phase voltages and phase currents are also used to calculate the powers. In this method, subject to the motor voltage and the desired speed, a compensation value is determined which is subtracted from the power factor cos $\phi_{actual}$. The result is multiplied by a factor determined for the optimum operating point and is subtracted as the voltage from the motor voltage to be output. In this manner, the flux is indirectly minimised as a function of the load and speed, such that a good efficiency of the asynchronous machine is achieved. The compensation value is determined using a group of curves which have to be plotted beforehand in a motor-specific manner.

A basic feature of the methods mentioned hitherto is that before the methods are applied, the characteristic curves or the groups of compensation curves have to be determined in a motor-specific, metrological manner. A general series application is significantly hampered by the resulting complexity.

A further algorithm-based approach is known from the literature, cf. Kirschen, Novotny, Lipo in "On-Line Efficiency Optimization of a Variable Motor Drive", IEEE Trans. Industry Appl., Vol. 21, No. 4, May/June 1985 pages 610 to 615. This document proposes a search algorithm which is to find the optimum rotor flux at any operating point of an asynchronous machine. In this iterative method, the rotor flux is reduced within fixed time intervals. After each reduction, the change in real power is analysed after a specific settling time. When the change in real power falls below a defined threshold, then according to the algorithm, the optimum-loss minimum has virtually been found. In this case, the step size of the change in rotor flux is halved and the flux is increased. When the change in real power again exceeds the defined threshold, the rotor flux is again reduced. Due to the cyclical adaptation of the flux in a positive and a negative direction, the method can also determine a stable and loss-optimised working point during changes in load. A disadvantage is that in the case of dynamic changes, the method can only work in a restricted manner. Furthermore, due to the permanent adaptation of the flux, a slight torque vibration can be observed on the driven shaft of the asynchronous machine. An advantage of the method is that the parameters of the motor do not have to be known.

Departing from the algorithm-based approaches described hitherto, model-based approaches are also known. DE 196 15 095 C1 discloses a loss minimisation which is used in asynchronous machines controlled in a field-oriented manner. In this case, the desired flux value is determined from the ratio of the flux value at the nominal point to the nominal moment. This characteristic number is multiplied by the desired moment. This produces a desired flux which is in the same ratio with the desired moment as that which prevails at the nominal operating point. As an alternative to the desired moment, the calculated actual moment can also be used.

$$\psi'_{rd,desired} = \frac{\psi'_{rd,N}}{m_N} m_{desired} \qquad (1)$$

In the mentioned method, the flux is reduced in the partial load range in a manner proportional to the load. A closed-loop control which operates in a field-oriented manner is required in order to use the method.

The literature contains further approaches which allow an efficiency-optimised closed-loop control, cf. Abrahamsen in "Energy Optimal Control of Induction Motor Drives", Institute of Energy Technology, Alborg University, Thesis February 2000. Further variants are mentioned in this document in addition to the previously described energy optimisation approaches. One of these variants provides an addition of a voltage correction value as a function of the determined slip frequency. A number of approaches are also combined under the general term "model-based optimisation approaches". These include, inter alia, a proposal in which an optimum stator frequency $f_s$ is to be calculated using a model for the respectively prevailing load. Another proposal provides calculating an optimised voltage $u_s$ also using a model as a function of the current motor load.

Chang and Kim in "Minimum-Time Minimum-Loss Speed Control of Induction Motors under Field-Oriented Control", IEEE Trans. Industrial Electronics, Vol. 44, No. 6, December 1997 pages 809 to 815, proposes a model-based method which specifically reduces copper losses in the motor. Since the theory presented in this source is of notable significance to the invention proposed here, this known approach will be described in more detail.

Basically, this approach attempts to determine the copper loss minimum of a system, controlled in a field-oriented manner as a function of the rotor flux and of the load moment for stationary operation. For this, the individual copper losses which occur in the stator and rotor, $$P_{Cu,s} = R_s i_s^2 \quad (2)$$

$$P_{Cu,r} = R_r i_r^2 \quad (3)$$

are considered as a total. After separating the currents into two orthogonal parts (as d, q parts), the following equation is obtained for the entire copper losses:

$$P_{Cu} = R_s(i_{sd}^2 + i_{sq}^2) + R_r(i_{rd}^2 + i_{rq}^2) \quad (4)$$

When the d-abscissa of the rotor coordinate system is positioned on the vector of the rotor flux $\psi_r$, the following expressions are obtained for the current components in the steady state:

$$i_{sd} = \frac{\psi_{rd}}{L_h} \quad (5)$$

$$i_{sq} = \frac{2}{3} \frac{m_M L_r}{z_p \psi_{rd} L_h} \quad (6)$$

$$i_{rd} = 0 \quad (7)$$

$$i_{rq} = -\frac{2}{3} \frac{m_M}{z_p \psi_{rd}} \quad (8)$$

When equations (5 to 8) are inserted into equation (4) and furthermore $$\psi'_{rd} = \frac{\psi_{rd}}{L_h} \quad (9)$$

is introduced, the copper losses can be described as follows as a function of the rotor flux and the load moment:

$$P_{Cu} = R_s \psi'^2_{rd} + \frac{4}{9} \frac{L_r^2 R_s + L_h^2 R_r}{L_h^4 z_p^2} \frac{m_M^2}{\psi'^2_{rd}} \quad (10)$$

When the copper losses (10) are derived according to the flux $\psi'_{rd}$ and when the derivation is set at zero (zero of the gradient), it is possible to calculate for any load moment a flux in which the copper losses $P_{Cu}$ are minimal.

$$\psi'_{rd,opt} = \frac{1}{L_h} \cdot \sqrt[4]{\frac{L_r^2 R_s + L_h^2 R_r}{R_s}} \sqrt{\frac{2}{3} \frac{1}{z_p}} \cdot \sqrt{m_M} \quad (11)$$

The equation proves that a desired rotor flux value can be determined for any load moment, which value can be used to minimise the copper losses. Thus, this solution process allows an optimum-loss closed-loop control in field-oriented controlled systems. It should be noted here that, in the case of increasing load moments, the optimum rotor flux can also assume orders of magnitude which cannot be approached or attained due to the saturation and which thus lie above the rated flux. Therefore, the rotor flux is to be restricted to a reasonable maximum value, for example to the rated flux.

The majority of the mentioned publications assume either a field-oriented controlled drive or a motor-specific measurement, associated with a considerable complexity, of characteristic curves or correction values or an iterative flux adaptation with restricted dynamics. Furthermore, many methods suffer from the disadvantage that a verifiably optimal loss minimisation is not possible in every case. An exception to this is provided by the last-mentioned method by Chang, Kim, which shows an exact derivation of a load-dependent rotor flux optimum for copper loss.

The proposed invention is to allow an open-loop or closed-loop control, based on a voltage-frequency characteristic curve, which reduces the copper losses in the asynchronous machine without a field orientation and thus contributes to an appreciable optimisation of efficiency, particularly in the partial load range. The method will also have satisfactory dynamics and tilt protection in restricted dynamic procedures. In terms of structure, a cos φ closed-loop control is to be employed which uses a desired value for cos phi which is determined as a function of speed or rotary field frequency and is ascertained deterministically from the motor ratings and equivalent circuit diagram data. An operation minimised in terms of copper loss is to be achieved using this desired value. This is the technical object of the claimed invention.

Reference is made to claim 1, 6 or 11 to achieve this object. They are included here.

The claimed invention is described in the following (in a supporting manner). The method is based on the calculation of the copper loss-optimal rotor flux according to equation (11) from the aforementioned source. Since in the case of a characteristic-based open-loop or closed-loop control of an asynchronous machine, no field orientation is present and hence the magnetising current or rotor flux $\psi'_{rd\,opt}$ cannot be directly controlled at its optimal value, it is only possible to use as the control value an adaptation of the motor frequency or the motor voltage to be impressed. According to the idea (of the invention), the motor voltage is adapted such that a flux develops which is optimal in terms of copper loss. To adapt the motor voltage, a cos phi closed-loop control is used which, in contrast to all known methods, establishes the speed-dependent or rotary field frequency-dependent desired (=set) value of the closed-loop control deterministically and in an optimum manner for copper loss only from the equivalent circuit diagram data and rating plate data of the asynchronous machine.

To determine the desired value (=set value), a field-orientated consideration is initially made. As shown in equation (11), the optimum magnetising current depends only on the load moment and on the equivalent circuit diagram data of the asynchronous machine, cf. FIG. 1. Assuming that the equivalent circuit diagram data of the asynchronous machine and of the nominal magnetising current is known, $$i_{MR,nominal} = \psi'_{rd,nominal} \quad (12)$$

then according to equation (11), the torque $M_{Opt,Eck}$ can be calculated which can be removed from the machine in a manner optimal for copper loss at this magnetisation.

$$m_{opt,Eck} = \frac{3}{2} i^2_{MR,nominal} L_h^2 z_p \sqrt{\frac{R_s}{L_r^2 R_s + L_h^2 R_r}} \quad (13)$$

Using this torque, it is possible to infer the field-oriented cross current which leads to the generation of the torque.

$$i_{sq,Opt,Eck} = \frac{2 L_r m_{Opt,Eck}}{3 L_h^2 z_p i_{MR,nominal}} \quad (14)$$

$$i_{sd,Opt,Eck} = i_{MR,nominal} \quad (15)$$

Using the known orthogonal current components, it is possible to determine the associated voltage components.

$$u_{sd,Opt,Eck} = \quad (16)$$
$$\sigma L_s \left[ \left( \frac{1}{\sigma T_s} + \frac{1-\sigma}{\sigma T_r} \right) i_{sd,Opt,Eck} - \omega_s i_{sq,Opt,Eck} - \frac{1-\sigma}{\sigma T_r} \psi'_{rd,nominal} \right]$$

$$u_{sq,Opt,Eck} = \quad (17)$$
$$\sigma L_s \left[ \omega_s i_{sd,Opt,Eck} + \left( \frac{1}{\sigma T_s} + \frac{1-\sigma}{\sigma T_r} \right) i_{sq,Opt,Eck} + \frac{1-\sigma}{\sigma} \omega \psi'_{rd,nominal} \right]$$

After simplifying, the voltage equations can be presented as follows.

$$u_{sd,Opt,Eck} = \sigma L_s \left( \frac{1}{\sigma T_s} i_{MR,nominal} - \omega_s i_{sq,Opt,Eck} \right) \quad (18)$$

$$u_{sq,Opt,Eck} = \sigma L_s \left[ \left( 1 + \frac{1-\sigma}{\sigma} \right) \omega_s i_{MR,nominal} + \frac{1}{\sigma T_s} i_{sq,Opt,Eck} \right] \quad (19)$$

It can be inferred from equations (18) and (19) that the voltages depend only on the currents and the stator frequency. The voltage angle and current angle can be determined from the orthogonal current and voltage equations.

$$\angle u_s = \varphi_U = \arctan\left( \frac{u_{sq,Opt,Eck}}{u_{sd,Opt,Eck}} \right) \quad (20)$$

$$\angle i_s = \varphi_I = \arctan\left( \frac{i_{sq,Opt,Eck}}{i_{sd,Opt,Eck}} \right) \quad (21)$$

By inserting equations (18), (19), (13), (14) and (15) as well as (13) into equations (20) and (21), it can be shown that the angle of the current only from the equivalent circuit diagram data of the motor and the angle of the voltage at a constant rotary field frequency is also constant for all magnetising currents.

$$\angle u_s = \varphi_U = \arctan \frac{\left[ \left(1 + \frac{1-\sigma}{\sigma}\right) \omega_s i_{MR,nominal} + \frac{1}{\sigma T_s} L_r i_{MR,nominal} \sqrt{\frac{R_s}{L_r^2 R_s + L_h^2 R_r}} \right]}{\left( \frac{1}{\sigma T_s} i_{MR,nominal} - \omega_s L_r i_{MR,nominal} \sqrt{\frac{R_s}{L_r^2 R_s + L_h^2 R_r}} \right)} \quad (22)$$

$$\angle i_s = \varphi_I = \arctan\left( L_r \sqrt{\frac{R_s}{L_r^2 R_s + L_h^2 R_r}} \right) \quad (23)$$

Equation (22) can be further simplified by cutting out the nominal magnetising current. Combining all variables which are only parameter-dependent, by constants $K_x$ produces the following equations for the angles:

$$\angle u_s = \varphi_U = \arctan\left( \frac{(K_2 \cdot K_3 + K_1 \omega_s)}{(K_3 - K_2 \omega_s)} \right) \quad (24)$$

$$\angle i_s = \varphi_I = \arctan(K_2) \quad (25)$$

with $$K_2 = L_r \sqrt{\frac{R_s}{L_r^2 R_s + L_h^2 R_r}} \quad (26)$$

$$K_1 = \left(1 + \frac{1-\sigma}{\sigma}\right) \quad (27)$$

$$K_3 = \frac{1}{\sigma T_s} \quad (28)$$

This shows that the current angle and voltage angle for an operation which is optimum in terms of copper loss can be calculated independently both of load and flux. Only the voltage angle depends on the rotary field frequency.

This understanding infers that cos φ, which can be calculated from the angle difference, must be constant at a constant rotary field frequency when the flux is to be controlled in an optimum manner in terms of copper loss.

$$\cos \varphi_{desired}(\omega_S) = \cos(\varphi_U(\omega_S) - \varphi_I) \quad (29)$$

Consequently, this derivation can be used to determine a cos phi for each rotary field frequency which, when adjusted by a suitable closed-loop control structure, achieves minimal copper losses in the asynchronous machine and thereby a high energy efficiency even for characteristic-supported open-loop or closed-loop controls.

Therefore, the invention provides a control system which adjusts an optimum cos phi in a manner dependent on rotational frequency by a cos phi controller. The desired values cos phi$_{desired}$ of the closed-loop control can be calculated in advance when the rating plate data and equivalent circuit diagram data of the machine are known and can be stored as a characteristic curve in the converter.

The claimed method does not require a field orientation and can be used for any voltage-frequency characteristic curve open-loop control with or without a speed feedback or with or without slip compensation.

In principle, it is possible to expand all existing characteristic curve open-loop controls by a cos φ$_{desired}$ closed-loop control.

Examples explain the invention and deepen the understanding thereof.

Figure 2:
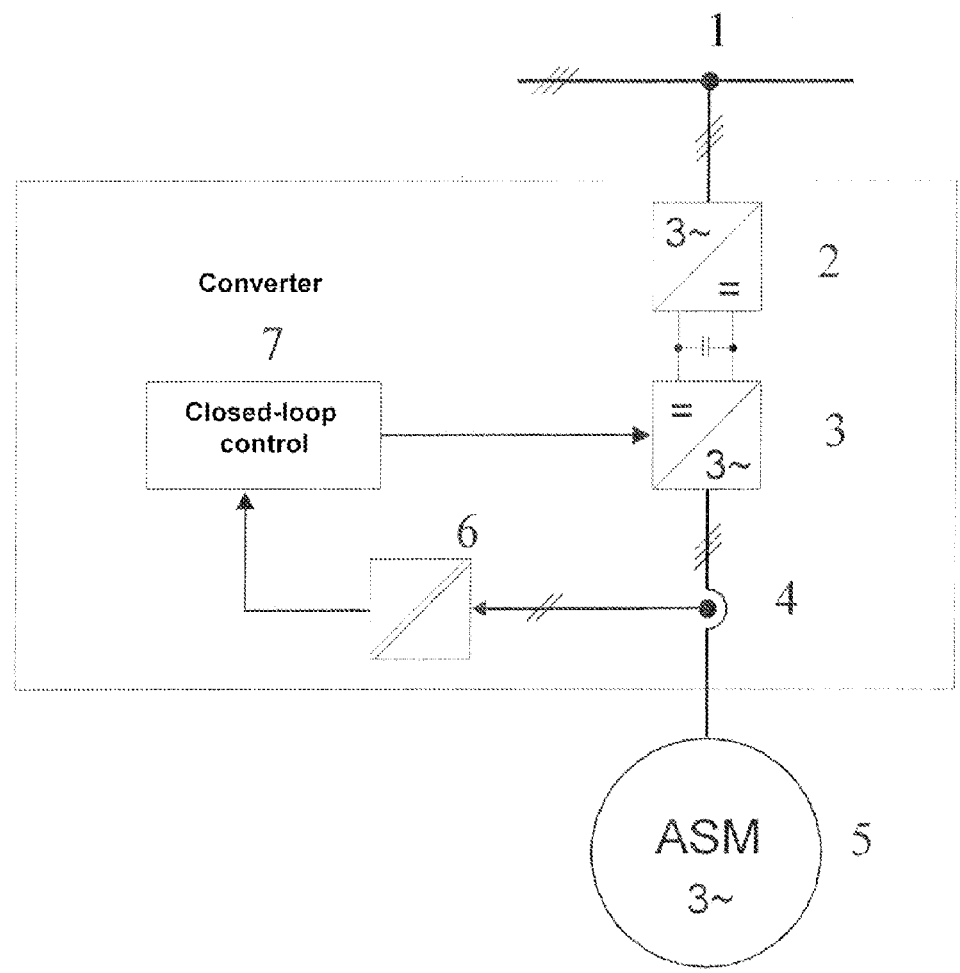
Figure 3:
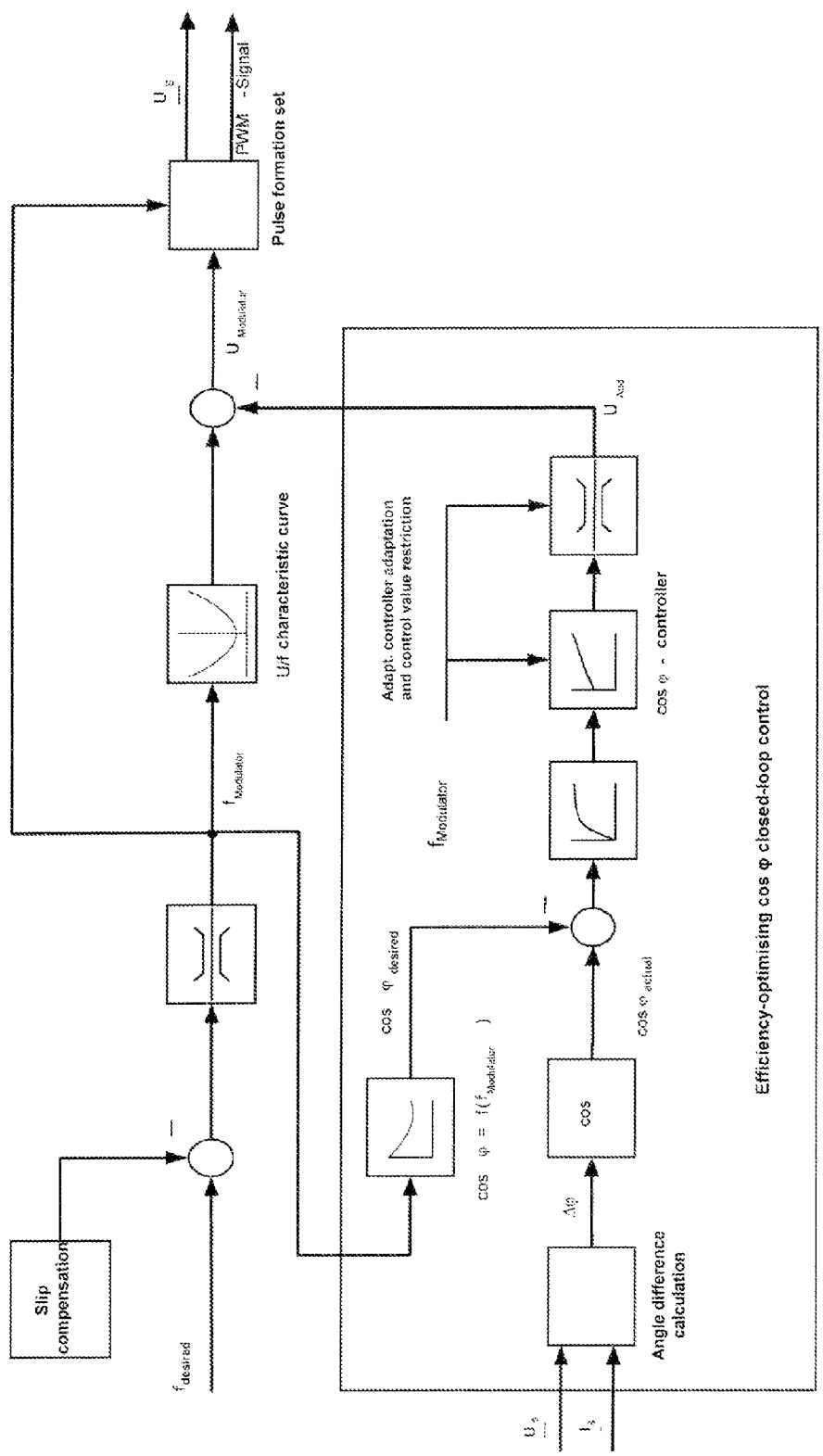
Figure 4:
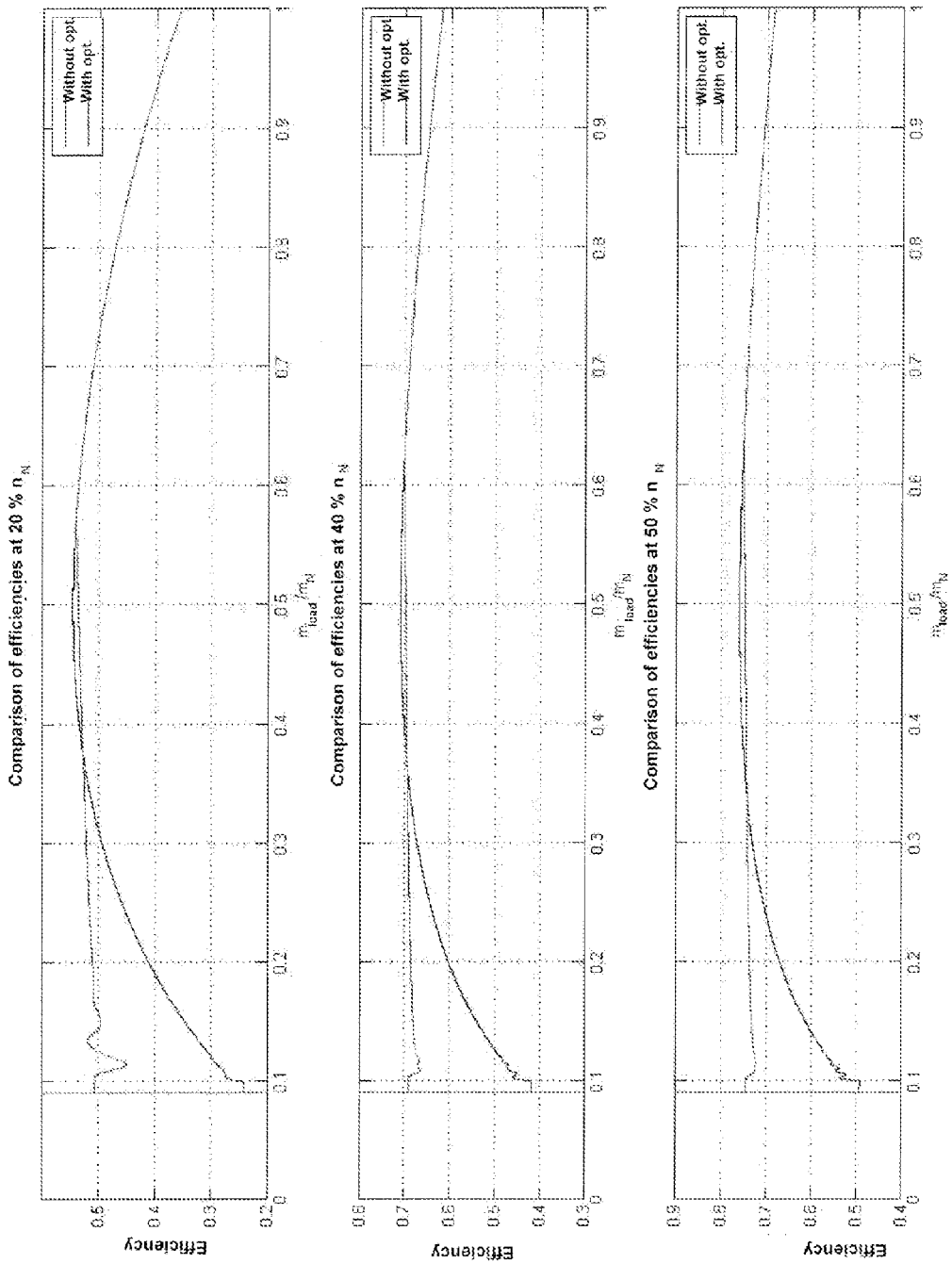
Figure 5:
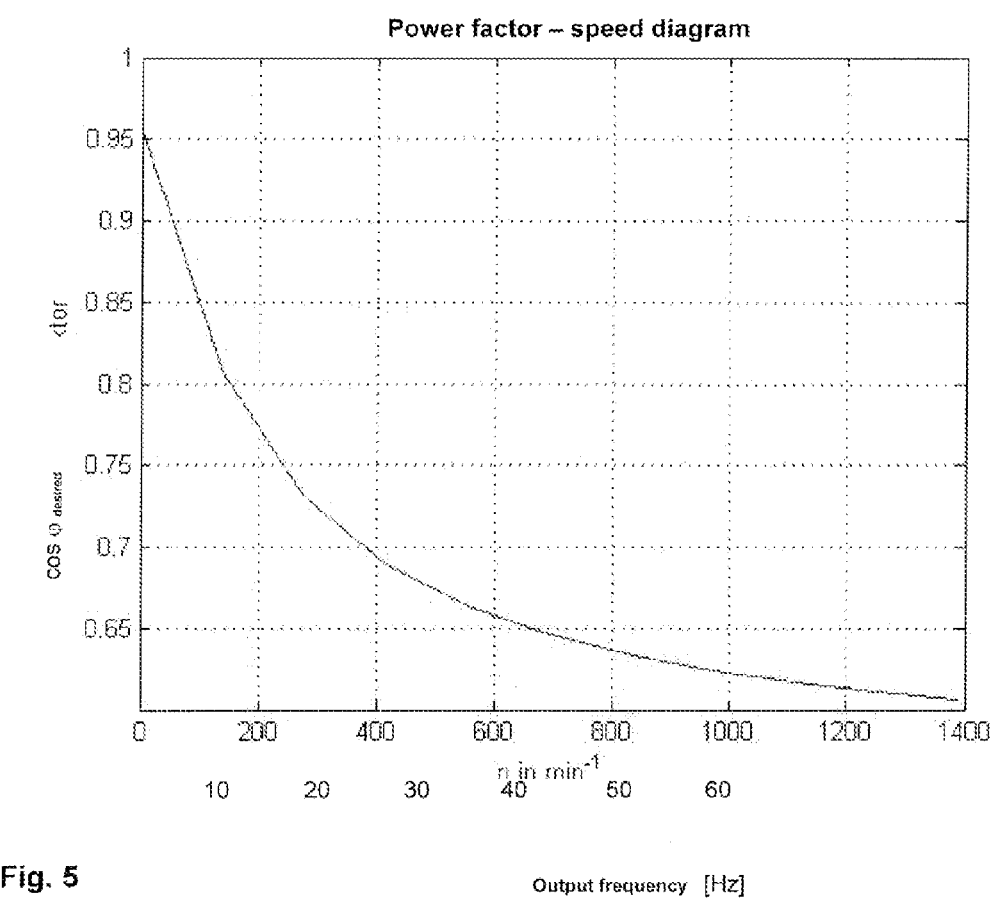

FIG. 1: is an equivalent circuit diagram of an asynchronous machine;

FIG. 2: is a basic structure of a frequency converter: supply network 1, rectifier 2, inverter 3, two or three-phase current detection 4, asynchronous machine 5, measuring signal processing 6 and optionally a transformation, closed-loop control 7;

FIG. 3: is a schematic diagram of the angle difference closed-loop control;

FIG. 4: is a comparison between the efficiency of a known U/f characteristic curve open-loop control and a U/f characteristic curve open-loop control according to an example of a cos phi closed-loop control according to the invention, as a function of the load moment for different desired speeds or desired frequencies (simulation on a 750 W standard motor, disregarding the frictional losses and iron losses);

FIG. 5: is an exemplary illustration of cos phi$_{desired}$ as a function of the output frequency.

FIG. 2 is a basic diagram of a device for implementing an example of the method according to the invention. In the diagram, a rectifier 2 rectifies the supply voltage 1 into a direct voltage which is fed to the inverter 3 as an intermediate circuit voltage. The asynchronous motor 5 is connected to the output terminals of the inverter. The valves of the inverter are controlled by a control circuit. At least two of the three motor phase currents are detected (at 4 and 6) and fed to the closed-loop control system 7.

Inside the closed-loop control system, the stator current vector is determined from the detected motor currents. The stator voltage vector can be determined metrologically by measuring the voltage at the output terminals of the inverter or it can be reconstructed from the detected intermediate circuit voltage and the switching state of the inverter. Furthermore, the intermediate circuit voltage can be detected or estimated metrologically.

Part of the closed-loop control system is shown in FIG. 3. The structure is based on a voltage-frequency characteristic curve open-loop control which is configured in any manner. This is expanded by the efficiency-optimised cos phi controller. Using the output or rotary field frequency $f_{Modulator}$, which can either be directly obtained from the desired frequency or desired speed or can be adapted, for example by a slip compensation, a maximum current controller or a speed closed-loop control, a desired value cos phi$_{desired}$ of the cos phi closed-loop control is determined using a characteristic curve.

FIG. 5 shows a characteristic curve of this type by way of example.

The actual value of the cos phi closed-loop control can be determined, for example from the difference in angle between the voltage vector and the current vector. It is also possible to determine the cos phi$_{actual}$ using the real power or apparent power or using the measured DC intermediate circuit current. A controller, which can be configured as a PI controller, for example, is used to determine a voltage $U_{Add}$ which then influences the output voltage $U_{Modulator}$ of the converter. To avoid over-magnetisation of the motor, a limit is recommended at the output of the cos phi closed-loop control, which limit prevents an increase in the output voltage $U_{Modulator}$ by restricting $U_{Add}$ to exclusively positive values. Furthermore, the control behaviour can be improved by adapting the positive restriction of the controller output $U_{Add}$ as a function of the current output frequency $f_{Modulator}$.

To improve the operating behaviour, it is also recommended to set the input difference of the cos phi closed-loop control at zero in the case of generator loads and thus to prevent engagement of the cos phi controller, optimised for motor operation.

Furthermore, when a PI controller structure is used for the cos phi closed-loop control, an adaptation of the proportional amplification as a function of the rotary field frequency is recommended.

The output frequency $f_{Modulator}$ and the output voltage $U_{Modulator}$ are transmitted to the pulse formation set which, knowing the intermediate circuit voltage, determines the control signals for the valves of the end stage. The pulse formation set can be configured according to the prior art, for example in a two-switch modulation, a space indicator modulation or a sinus triangle modulation. To optimise the behaviour, when calculating the modulation factor, the inverter error characteristic curve can be considered.

The effect of the improvement in efficiency is shown by way of example in FIG. 4. The illustration shows that particularly in the partial load range (0 ... 0.4 $m_{nominal}$), a significant efficiency optimisation can be achieved by the described new cos φ closed-loop control.

The invention claimed is:

1. A method for an open-loop or closed-loop control of an asynchronous machine with or without speed feedback, wherein the asynchronous motor is controlled by a control device, the method comprising the following steps
    a. specifying and impressing of a voltage vector rotating at a rotary field frequency ($f_{modulator}$), both the rotary field frequency and the voltage vector being determined by an open-loop or closed-loop control based on a voltage-frequency characteristic curve and the voltage vector ($U_S$) being adapted by a cos φ closed-loop control;
    b. calculating of desired values of cos φ using rating plate data and equivalent circuit diagram data for an at least loss-improved operation of the asynchronous machine to calculate cos φ$_{desired}$ resulting in a loss-improved operation;
    c. determining of a value for cos φ$_{actual}$ using the impressed voltage vector ($U_S$) and a current vector ($I_S$) or using real power and apparent power;
    d. calculating a difference between cos φ$_{desired}$ and cos φ$_{actual}$ and feeding a cos φ closed-loop control with this input difference;
    e. calculating and limiting a control value ($U_{Add}$) of the controller for cos φ and adapting the voltage vector ($U_S$) by the control value of the cos φ closed-loop control.

2. The method according to claim 1, wherein the controller amplification of the controller for cos φ is adapted as a function of desired speed or actual speed or as a function of the rotary field frequency of the asynchronous machine.

3. The method according to claim 1, wherein an output signal of the cos φ controller is limited as a function of desired speed or actual speed or as a function of the rotary field frequency.

4. The method according to claim 1, wherein during a generator operation, the controller of cos φ behaves differently from a motor operation.

5. The method of claim 4, the cos φ controller during a generator operation freezes the controller output signal.

6. The method according to claim 1, wherein the control difference of the controller of cos φ is limited to a maximum value in the positive or negative direction.

7. A method for the open-loop or closed-loop control of an asynchronous machine to reduce copper loss with or without a speed signal feedback, wherein the asynchronous motor is controlled by a control device according to the following method steps
    a. specifying and impressing a voltage vector ($U_S$) rotating at a rotary field frequency ($f_{Modulator}$), both the rotary field frequency and the voltage vector being determined by an open-loop or closed-loop control based on a voltage-frequency characteristic curve and the voltage vector ($U_S$) being adapted by a cos phi closed-loop control, b. calculating cos phi desired values using rating plate data and equivalent circuit diagram data for a loss-optimised operation of the asynchronous machine to calculate cos phi$_{desired}$ values, resulting in a loss-optimised operation, c. determining of a cos phi$_{actual}$ value using the impressed voltage vector ($U_S$) and the current vector ($I_S$) or using the real power and apparent power, d. calculating a difference between cos phi$_{desired}$ and cos phi$_{actual}$ and feeding a cos phi closed-loop control, configured in any manner, with this input difference, e. calculating and limiting the control value ($U_{Add}$) of the cos phi closed-loop control and adapting the voltage vector ($U_S$) by the control value ($U_{Add}$) of a cos phi closed-loop control.

8. The method according to claim 7, wherein a controller amplification of the cos phi controller is adapted as a function of desired speed or actual speed or as a function of the rotary field frequency.

9. The method according to claim 7, wherein an output of the cos phi controller is limited as a function of desired (set) speed or actual speed or as a function of the rotary field frequency.

10. The method according to claim 7, wherein during a generator operation, the cos phi controller behaves differently from a motor operation, for example with a freezing of the controller output signal.

11. The method according to claim 7, wherein the control difference of the cos phi controller is limited to a maximum value in the positive and/or negative direction.

12. A method for influencing an asynchronous machine, wherein the asynchronous machine is influenced by an acting control device with the steps
   a. specifying or impressing a voltage vector ($U_S$) rotating at a rotary field frequency ($f_{Modulator}$) for the machine, both the rotary field frequency and the voltage vector being determined by an open-loop or closed-loop control based on a voltage-frequency characteristic curve, to track the voltage vector ($U_S$) during operation by a cos φ closed-loop control as follows:
      ba. calculating of desired values of cos φ using at least electrical data of the asynchronous machine, such as rating plate data and/or equivalent circuit diagram data;
      bb. determining values of cos φ$_{actual}$ involving physical data, comprising the specified or impressed voltage vector ($U_S$) and a current vector ($I_S$);
      bc. determining differences between corresponding values of cos φ$_{desired}$ and cos φ$_{actual}$ and feeding a cos φ closed-loop control with these differences as input variable;
      bd. calculating an output variable of the controller as control value ($U_{Add}$) for the control device;
      be. limiting the control value ($U_{Add}$) and adaptation of the voltage vector ($U_S$) by the control value ($U_{Add}$);
   b. providing a loss-optimised operation of the asynchronous machine.

13. The method according to claim 12, wherein a controller amplification of the cos φ controller is adapted as a function of desired speed or actual speed or as a function of the rotary field frequency.

14. The method according to claim 12, wherein the output of the cos φ controller is limited as a function of desired speed or actual speed or as a function of the rotary field frequency.

15. The method according to claim 12, wherein during a generator operation, the cos φ controller behaves differently from a motor operation.

16. The method of claim 15, the cos φ controller during a generator operation freezes the controller output signal.

17. The method according to any of claim 12, wherein a control difference of the cos φ controller is limited to a maximum value in the positive or negative direction.

18. The method according to claim 12, wherein step (ba) is carried out using the equations (24) to (29) as:

$$\angle u_s = \varphi_U = \arctan\left(\frac{(K_2 \cdot K_3 + K_1 \omega_s)}{(K_3 - K_2 \omega_s)}\right)$$

$$\angle i_s = \varphi_I = \arctan(K_2) \text{ with}$$

$$K_2 = L_r \sqrt{\frac{R_s}{L_r^2 R_s + L_h^2 R_r}} \text{ and } K_1 = \left(1 + \frac{1-\sigma}{\sigma}\right) \text{ and}$$

$$K_3 = \frac{1}{\sigma T_s} \text{ wherein}$$

$$\cos\varphi_{desired}(\omega_S) = \cos(\varphi_U(\omega_S) - \varphi_I)_1$$

19. The method according to claim 12, wherein influencing is carried out in a manner optimum for copper loss.

20. The method according to claim 12, wherein the method is carried out with or without speed feedback.

21. The method according to claim 12, wherein the control device is a converter or a servo converter.

22. The method according to claim 12, wherein the influencing of the asynchronous machine is an open-loop control or a closed-loop control.

23. The method of claim 12, the physical data comprising real power and apparent power.

* * * * *